(12) United States Patent
Yoshino et al.

(10) Patent No.: US 8,481,620 B2
(45) Date of Patent: Jul. 9, 2013

(54) PROCESS FOR PRODUCING RESIN COMPOSITION

(75) Inventors: Taiki Yoshino, Wakayama (JP); Masahiro Mori, Wakayama (JP); Akira Takenaka, Wakayama (JP)

(73) Assignee: Kao Corporation, Tokyo (JP)

( * ) Notice: Subject to any disclaimer, the term of this patent is extended or adjusted under 35 U.S.C. 154(b) by 174 days.

(21) Appl. No.: 13/125,730

(22) PCT Filed: Oct. 22, 2009

(86) PCT No.: PCT/JP2009/068193
§ 371 (c)(1),
(2), (4) Date: Apr. 22, 2011

(87) PCT Pub. No.: WO2010/047370
PCT Pub. Date: Apr. 29, 2010

(65) Prior Publication Data
US 2011/0196076 A1    Aug. 11, 2011

(30) Foreign Application Priority Data
Oct. 24, 2008 (JP) .................................. 2008-274314

(51) Int. Cl.
| C08K 5/10 | (2006.01) |
| C08K 5/23 | (2006.01) |
| C08K 3/32 | (2006.01) |
| C08K 3/34 | (2006.01) |
| C08J 3/18 | (2006.01) |
| C08L 67/00 | (2006.01) |

(52) U.S. Cl.
USPC ........... 524/100; 524/190; 524/306; 524/307; 524/317; 524/414; 524/451; 524/539; 528/503

(58) Field of Classification Search
USPC ................ 524/100, 190, 306, 307, 317, 414, 524/451; 528/503
See application file for complete search history.

(56) References Cited

U.S. PATENT DOCUMENTS
8,030,382 B2 * 10/2011 Endo et al. .................... 524/141

FOREIGN PATENT DOCUMENTS
| JP | 2005-146261 A | 6/2005 |
| JP | 2005-307128 A | 11/2005 |
| JP | 2006-348246 A | 12/2006 |
| JP | 2007-152760 A | 6/2007 |
| JP | 2007-191630 A | 8/2007 |
| JP | 2008-37939 A | 2/2008 |
| JP | 2008-38142 A | 2/2008 |
| JP | 2008-88359 A | 4/2008 |
| JP | 2008-88363 A | 4/2008 |
| JP | 2008-88374 A | 4/2008 |
| JP | 2008-156616 A | 7/2008 |
| WO | WO2008/102919 | * 8/2008 |

OTHER PUBLICATIONS

International Search Report for PCT/JP2009/068193, mailed on Jan. 26, 2010.
Full English machine translation of JP-2005-146261-A published on Jun. 9, 2005.
Full English machine translation of JP-2005-307128-A published on Nov. 4, 2005.
Full English machine translation of JP-2006-131716-A published on May 25, 2006.
Full English machine translation of JP-2006-348246-A published on Dec. 28, 2006.
Full English machine translation of JP-2007-191630-A published on Aug. 2, 2007.
Full English machine translation of JP-2008-156616-A published on Jul. 10, 2008.
Full English machine translation of JP-2008-195834-A published on Aug. 28, 2008.
Full English machine translation of JP-2008-37939-A published on Feb. 21, 2008.
Full English machine translation of JP-2008-38142-A published on Feb. 21, 2008.
Full English machine translation of JP-2008-88359-A published on Apr. 17, 2008.
Full English machine translation of JP-2008-88363-A published on Apr. 17, 2008.
Full English machine translation of JP-2008-88374-A published on Apr. 17, 2008.
Chinese Office Action for Application No. 200980141811.0 dated Jul. 20, 2012 (with English translation).
Na et al., "Study on the Morphology and Properties of PP/PLA Blends", Plastics Science and Technology, vol. 34, No. 5, 2006, 5 pages provided.

* cited by examiner

*Primary Examiner* — Tae H Yoon
(74) *Attorney, Agent, or Firm* — Birch, Stewart, Kolasch & Birch, LLP

(57) ABSTRACT

A method for producing a resin composition, including the steps of melt-kneading a raw material A containing a polylactic acid resin, a crystal nucleating agent, and a plasticizer containing an ester compound formed between a polycarboxylic acid having a hydrocarbon group having 1 to 7 carbon atoms and a mono-alcohol having a hydrocarbon group having 1 to 7 carbon atoms, to prepare a polylactic acid-containing melt-kneaded mixture having a relative crystallinity of 70% or more (step A); and further melt-kneading the polylactic acid-containing melt-kneaded mixture obtained by the step A and a raw material B containing a polypropylene resin and a compatibilizing agent (step B). The resin composition obtainable by the method of the present invention can be suitably used in various industrial applications, such as daily sundries, household electric appliance parts, and automobile parts.

12 Claims, No Drawings

PROCESS FOR PRODUCING RESIN COMPOSITION

TECHNICAL FIELD

The present invention relates to a method for producing a resin composition containing a polylactic acid resin and a polypropylene resin as main components, a resin composition obtainable by the method, and a molded article of the above-mentioned resin composition.

BACKGROUND ART

Polylactic acid resins have been expected as bio-polymers which can serve as substitutes for resins produced from fossil raw materials such as petroleum because a monomer lactic acid can be inexpensively produced from a biomass raw material such as maize by a fermentation method utilizing a microorganism, and its melting point is also as high as about 170° C. so that melt-molding can be carried out.

However, polylactic acid resins have a slow crystallization velocity, thereby posing limitations on their use as molded articles. For example, in a case where a polylactic acid resin is injection-molded, there are serious practical disadvantages in moldability and heat resistance that not only a long molding cycle time and heat treatment after the molding are necessitated, but also deformation upon molding or upon heat treatment is large.

On the other hand, the techniques of blending plural resins have been widely known as polymer-alloy techniques, which are widely utilized for the purposes of improving the disadvantages of the individual polymers.

Patent Publication 1 discloses a thermoplastic resin composition having widely improved mechanical properties, hydrolytic resistance, and heat resistance by combining a polylactic acid resin and an aromatic polyester resin.

Patent Publication 2 discloses an automobile part made of a polylactic acid resin composition having excellent heat resistance, obtained by blending a polylactic acid resin with a separately prepared specified propylene resin composition, and further including glass fiber, a modified propylene resin, and a crystallization promoter thereto.

Patent Publication 3 discloses a resin composition having excellent moldability, impact resistance, and heat resistance, by blending a polylactic acid resin, and a polyolefin resin, and a specified compatibilizing agent.

In addition, Patent Publication 4 discloses a resin composition containing a polyolefin, a polylactic acid and a carboxylic acid ester of a polyhydric alcohol, wherein the polylactic acid and the carboxylic acid ester of a polyhydric alcohol are blended in specified amounts, whereby a resin composition is provided with mechanical properties, such as tensile modulus and tear strength, that are sufficient for practical purposes. More specifically, Example 1 gives an example of a film obtained by kneading a polylactic acid and a carboxylic acid ester of a polyhydric alcohol to form a polylactic acid master batch, blending the resulting master batch with a polyethylene, and molding the mixture to form a film.

PRIOR ART PUBLICATIONS

Patent Publications
Patent Publication 1: Japanese Patent Laid-Open No. 2006-131716
Patent Publication 2: Japanese Patent Laid-Open No. 2008-88359
Patent Publication 3: Japanese Patent Laid-Open No. 2008-38142
Patent Publication 4: Japanese Patent Laid-Open No. 2008-195834

SUMMARY OF THE INVENTION

The present invention relates to:
[1] a method for producing a resin composition, including the steps of:
melt-kneading a raw material A containing a polylactic acid resin, a crystal nucleating agent, and a plasticizer containing an ester compound formed between a polycarboxylic acid having a hydrocarbon group having 1 to 7 carbon atoms and a mono-alcohol having a hydrocarbon group having 1 to 7 carbon atoms, to prepare a polylactic acid-containing melt-kneaded mixture having a relative crystallinity of 70% or more (step A); and
further melt-kneading the polylactic acid-containing melt-kneaded mixture obtained by the step A and a raw material B containing a polypropylene resin and a compatibilizing agent (step B);
[2] a resin composition obtainable or obtained by the method as defined in the above-mentioned [1]; and
[3] a resin molded article wherein the resin composition obtainable or obtained by the method as defined in the above-mentioned [1] is injection-molded.

DETAILED DESCRIPTION OF THE INVENTION

The resin compositions obtainable according to conventional techniques do not yet have sufficient impact resistance, so that resin compositions having further impact resistance are in demand.

The present invention relates to a method for producing a resin composition having excellent impact resistance, a resin composition obtainable by the method, and a molded article of the above-mentioned resin composition.

The resin composition obtainable by the method of the present invention exhibits excellent effects of having excellent impact resistance.

The method for producing a resin composition of the present invention includes the steps of:
melt-kneading a raw material A containing a polylactic acid resin (A), a crystal nucleating agent (B), and a plasticizer (C) containing an ester compound formed between a polycarboxylic acid having a hydrocarbon group having 1 to 7 carbon atoms and a mono-alcohol having a hydrocarbon group having 1 to 7 carbon atoms, to prepare a polylactic acid-containing melt-kneaded mixture having a relative crystallinity of 70% or more (step A); and
further melt-kneading the polylactic acid-containing melt-kneaded mixture obtained by the step A and a raw material B containing a polypropylene resin (D) and a compatibilizing agent (E) (step B), and a great feature of the method resides in that the melt-kneading is carried out over two steps.

In recent years, for the purposes of improving the disadvantages of the resins, techniques of blending plural resins have been performed, among which a polymer-alloy technique has been remarked. A polymer-alloy is, in general, prepared by melt-kneading the resins having different properties with each other, during the melt-kneading, an additive, for example, a crystal nucleating agent or a compatibilizing agent or the like is simultaneously blended with the resins. However, in the present invention, by controlling the blending of additives, in other words, by previously blending a polylactic acid resin with a crystal nucleating agent and a plasticizer to give a melt-kneaded mixture, and blending the resulting melt-kneaded mixture with a polypropylene resin as a resin having a different property, simultaneously with a compatibilizing agent, while the detailed reasons are unknown, it is considered that the crystallization of the polylactic acid resin having a slow crystallization velocity is promoted by the crystal nucleating agent and the plasticizer in the melt-kneading of the step A, so that the polylactic acid resin is modified, in other words, a polylactic acid resin is crystallized to have a relative crystallinity of 70% or more is obtained. Further, it is deduced in the melt-kneading of the step B that the crystallization of the polylactic acid resin is further promoted due to crystallization latent heat of the polypropylene resin, so that both the resins are in equilibrium to be crystallized; therefore, the resulting resin composition has excellent impact resistance.

In addition, one feature of the present invention resides in the use of an ester compound formed between a polycarboxylic acid having a hydrocarbon group having 1 to 7 carbon atoms, and a mono-alcohol having a hydrocarbon group having 1 to 7 carbon atoms, as a plasticizer. It is considered that the ester compound obtainable by using specified raw materials as described above has a high affinity with the polylactic acid resin, so that the ester compound is favorably dispersed in the polylactic acid resin by the melt-kneading in the step A, thereby softening the polylactic acid resin; consequently, the crystallization of the polylactic acid resin is even more promoted. On the other hand, in a case where the carboxylic acid ester of a polyhydric alcohol described in Patent Publication 4 is used as a plasticizer, it is considered that the plasticizer is more likely to be present at the interface of the polylactic acid due to its structure, which, therefore, functions as a compatibilizing agent, so that the technical idea is different from that of the present invention.

The method for producing a resin composition of the present invention includes the steps of:

melt-kneading a raw material A containing a polylactic acid resin (A), a crystal nucleating agent (B), and a plasticizer (C) containing an ester compound formed between a polycarboxylic acid having a hydrocarbon group having 1 to 7 carbon atoms and a mono-alcohol having a hydrocarbon group having 1 to 7 carbon atoms, to prepare a polylactic acid-containing melt-kneaded mixture having a relative crystallinity of 70% or more (step A); and further melt-kneading the polylactic acid-containing melt-kneaded mixture obtained by the step A and a raw material B containing a polypropylene resin (D) and a compatibilizing agent (E) (step B).

In the step A, a raw material A containing a polylactic acid resin (A), a crystal nucleating agent (B), and a plasticizer (C) containing an ester compound formed between a polycarboxylic acid having a hydrocarbon group having 1 to 7 carbon atoms and a mono-alcohol having a hydrocarbon group having 1 to 7 carbon atoms are melt-kneaded, to prepare a polylactic acid-containing melt-kneaded mixture having a relative crystallinity of 70% or more.

<Polylactic Acid Resin (A)>

The polylactic acid resin in the present invention contains a polylactic acid obtainable by polycondensing lactic acid components alone as raw material monomers, and/or a polylactic acid obtainable by polycondensing a lactic acid component and a hydroxycarboxylic acid component other than lactic acid (hereinafter simply referred to as a hydroxycarboxylic acid component) as raw material monomers.

Lactic acids exist in the form of optical isomers, L-lactic acid (L-form) and D-lactic acid (D-form). In the present invention, the lactic acid component may contain either one of the optical isomers or both, and it is preferable to use a lactic acid having high optical purity, which contains either one of the optical isomers as a main component, from the viewpoint of moldability of the resin composition. The term "main component" as used herein refers to a component that is contained in an amount of 50% by mol or more of the lactic acid component.

The L-form or D-form, in other words, the form that is contained in a larger amount of the above isomers, is contained in an amount of preferably from 80 to 100% by mol, more preferably from 90 to 100% by mol, and even more preferably from 99 to 100% by mol, of the lactic acid component, in a case where the lactic acid components alone are polycondensed. Here, since the Inform and the D-form are contained in a total amount of substantially 100% by mol in the lactic acid component, the form that is contained in a smaller amount of the above isomers is contained in an amount of preferably from 0 to 20% by mol, more preferably from 0 to 10% by mol, and even more preferably from 0 to 1% by mol, of the lactic acid component. The amount of the isomer contained in a larger amount in the lactic acid component as used herein is also referred to optical purity.

The optical purity of the polylactic acid resin can be obtained in accordance with the measurement method for D-form content described in "*Poriorefin-toh Gosei-jushi-sei Shokuhin Youki Houso-toh ni Kansuru Jishukijun (Self-Standards Concerning Food Containers and Wrappings Made of Synthetic Resins Such as Polyolefins)*," *Revised Third Edition*, supplemented in June, 2004, Chapter 3 Eisei Shikenho (Hygienic Test Method), p. 12-13." Specifically, the optical purity is measured according to the method described in Examples set forth below.

The L-form or D-form, in other words, the form that is contained in a larger amount of the above isomers, is contained in an amount of preferably from 85 to 100% by mol, and more preferably from 90 to 100% by mol, of the lactic acid component in a case where a lactic acid component and a hydroxycarboxylic acid component are polycondensed. In addition, the form that is contained in a smaller amount of the above isomers is contained in an amount of preferably from 0 to 15% by mol, and more preferably from 0 to 10% by mol, of the lactic acid component.

On the other hand, the hydroxycarboxylic acid component includes hydroxycarboxylic acid compounds such as glycolic acid, hydroxybutyric acid, hydroxyvaleric acid, hydroxypentanoic acid, hydroxycaproic acid, and hydroxyheptanoic acid, which can be utilized alone or in a combination of two or more kinds. Among them, glycolic acid and hydroxycaproic acid are preferred, from the viewpoint of satisfying both impact resistance and strength of the resin composition, and having heat resistance and transparency.

In addition, in the present invention, the lactic acid dimer and the dimer of the hydroxycarboxylic acid compound mentioned above may be contained in the respective components. The lactic acid dimer is exemplified by a lactide, which is a cyclic lactic acid dimer, and the dimer of the hydroxycarboxylic acid compound is exemplified by a glycolide, which is a cyclic glycolic acid dimer. Here, the lactides exist in the form of L-lactide, which is a cyclic L-lactic acid dimer; D-lactide, which is a cyclic D-lactic acid dimer; meso-lactide, which is a cyclic dimer of D-lactic acid and L-lactic acid; and DL-lactide, which is a racemic mixture of the D-lactide and the L-lactide. In the present invention, any one of the lactides can be used, and the D-lactide and the L-lactide are preferred, from the viewpoint of satisfying both strength and impact resistance of the resin composition, and having heat resistance and transparency. Here, the lactic acid dimer may be contained in either one of the lactic acid component in the embodiment where the lactic acid components alone are polycondensed, or the embodiment where the lactic acid component and the hydroxycarboxylic acid component are polycondensed.

The lactic acid dimer is contained in an amount of preferably from 80 to 100% by mol, and more preferably from 90 to 100% by mol, of the lactic acid component, from the viewpoint of satisfying both strength and impact resistance of the resin composition.

The dimer of the hydroxycarboxylic acid compound is contained in an amount of preferably from 80 to 100% by mol, and more preferably from 90 to 100% by mol, of the hydroxycarboxylic acid component, from the viewpoint of satisfying both strength and impact resistance of the resin composition.

The polycondensation reaction of the lactic acid components alone, and the polycondensation reaction of the lactic acid component and the hydroxycarboxylic acid component can be carried out, but not particularly limited to, using known methods.

Thus, the raw material monomers are selected, whereby a polylactic acid, for example, made from either component of L-lactic acid or D-lactic acid in an amount of 85% by mol or more and less than 100% by mol, and a hydroxycarboxylic acid component in an amount exceeding 0% by mol and 15% by mol or less, is obtained. Among them, a polylactic acid obtained by using a lactide, which is a cyclic lactic acid dimer, and a glycolide, which is a cyclic glycolic acid dimer, and caprolactone as raw material monomers is preferred.

In addition, in the present invention, as the polylactic acid, a stereocomplex polylactic acid, composed of two kinds of polylactic acids, each obtained from a lactic acid component containing an isomer different from one another as a main component, may be used, from the viewpoint of satisfying both strength and impact resistance of the resin composition, and having heat resistance and transparency.

One polylactic acid constituting the stereocomplex polylactic acid [hereinafter referred to as a polylactic acid (a)] contains the L-form in an amount of from 90 to 100% by mol, and other component including the D-form in an amount of from 0 to 10% by mol. The other polylactic acid [hereinafter referred to as a polylactic acid (b)] contains the D-form in an amount of from 90 to 100% by mol, and other component including the L-form in an amount of from 0 to 10% by mol. Other components besides the L-form and the D-form include dicarboxylic acids, polyhydric alcohols, hydroxycarboxylic acids, lactone, and the like, each having a functional group capable of forming two or more ester bonds. Also, other components may be a polyester, a polyether, a polycarbonate, or the like, each having two or more unreacted functional groups mentioned above in one molecule.

The polylactic acid (a) and the polylactic acid (b) in the stereocomplex polylactic acid are in a weight ratio, i.e. polylactic acid (a)/polylactic acid (b), of preferably from 10/90 to 90/10, more preferably from 20/80 to 80/20, and even more preferably from 40/60 to 60/40.

The melting point (Tm)(° C.) of the polylactic acid is preferably from 140° to 250° C., more preferably from 150° to 240° C., and even more preferably from 160° to 230° C., from the viewpoint of dispersibility of the plasticizer and the crystal nucleating agent, or the like, and from the viewpoint of impact resistance, degradation, and productivity of the resin composition. Here, the melting point of the resin as used herein is measured in accordance with the method described in Examples set forth below.

In addition, the glass transition temperature of the polylactic acid as used herein is a value obtained from a peak temperature of loss modulus (E") in dynamic viscoelasticity measurement, and the value is a value that is measured by the measurement method for dynamic viscoelasticity described in Examples.

The polylactic acid is contained in the polylactic acid resin in an amount of preferably 80% by weight or more, more preferably 90% by weight or more, and even more preferably substantially 100% by weight.

In addition, the polylactic acid resin is contained in the resin composition, but not particularly limited to, in an amount of preferably 10% by weight or more, more preferably from 20 to 60% by weight, and even more preferably from 20 to 50% by weight.

Here, the polylactic acid resin can be synthesized according to the above method, and commercially available products include, for example, "LACEA Series" (manufactured by Mitsui Chemicals, Inc.), such as LACEA H-100, H-280, H-400, and H-440; "Nature Works" (manufactured by Nature Works), such as 3001D, 3051D, 4032D, 4042D, 6201D, 6251D, 7000D, and 7032D; and "Ecoplastic U'z Series" (manufactured by TOYOTA MOTOR CORPORATION), such as Ecoplastic U'Z S-09, S-12, and S-17. Among them, LACEA H-100, H-280, H-400, H-440 (manufactured by Mitsui Chemicals, Inc.), 3001D, 3051D, 4032D, 4042D, 6201D, 6251D, 7000D, and 7032D (manufactured by Nature Works), and Ecoplastic U'z S-09, S-12, and S-17 (manufactured by TOYOTA MOTOR CORPORATION) are preferred, from the viewpoint of strength and impact resistance of the resin composition.

<Crystal Nucleating Agent (B)>

The crystal nucleating agent in the present invention is not particularly limited, and the crystal nucleating agent is preferably at least one member selected from the group consisting of a compound having a hydroxyl group or hydroxyl groups and an amide group in one molecule, metal salts of phenylphosphonic acids, phthalocyanines, metal salts of phosphoric esters, metal salts of dialkyl esters of aromatic sulfonic acids, metal salts of rosin acids, aromatic carboxylic acid amides, rosin amides, carbohydrazides, N-substituted ureas, salts of melamine compounds, uracils, and talc, from the viewpoint of impact resistance and moldability of the resin composition. The above crystal nucleating agent has a feature that the agent is dissolved during melt-kneading of a polylactic acid resin to form a large number of crystal nuclei, thereby making it possible to progress with crystallization of the polylactic acid, preceding that of the polypropylene resin added afterwards, and a feature that the agent has metal ions, an amide group, an NH group or the like in the compound, whereby the agent has excellent interactions with (adsorbability to) both the polylactic acid resin and the polypropylene resin; therefore, it is considered that even with a composition containing resins having different properties, crystallization velocity can be synergistically favorably increased. In addition, the above-mentioned crystal nucleating agent has excellent heat resistance, so that the agent is suitably used. Here, in the present specification, among the above-mentioned crystal nucleating agents, the compound having a hydroxyl group or hydroxyl groups and an amide group or amide groups in one molecule is referred to as a crystal nucleating agent (1), and the others are referred to as a crystal nucleating agent (2) in some cases.

The compound having a hydroxyl group or hydroxyl groups and an amide group or amide groups in one molecule [crystal nucleating agent (1)] is preferably a fatty acid amide having a hydroxyl group or hydroxyl groups, and more preferably a fatty acid amide having two or more hydroxyl groups and two or more amide groups in one molecule, from the viewpoint of crystallization velocity, and compatibility with the polylactic acid resin, and impact resistance and moldability of the resin composition.

The crystal nucleating agent (1) has a melting point of preferably 65° C. or more, more preferably from 70° to 220° C., and even more preferably from 80° to 190° C., from the viewpoint of improving dispersibility of the crystal nucleating agent upon kneading and improving a crystallization velocity. Here, the melting point of the crystal nucleating agent as used herein is measured by a method described in Examples set forth below.

Specific examples of the crystal nucleating agent (1) include hydroxyfatty acid monoamides such as 12-hydroxystearic acid monoethanolamide; hydroxyfatty acid bisamides, such as methylenebis 12-hydroxystearic amide, ethylenebis 12-hydroxystearic amide, and hexamethylenebis 12-hydroxystearic amide; hydroxyfatty acid triamides, such as 12-hydroxystearic triglyceride; and the like. Hydroxyfatty acid bisamides, such as ethylenebis 12-hydroxystearic amide and hexamethylenebis 12-hydroxystearic amide, and 12-hydroxystearic triglyceride are more preferred, and ethylenebis 12-hydroxystearic amide is even more preferred, from the viewpoint of moldability, heat resistance, and impact resistance of the resin composition, and anti-blooming property of the crystal nucleating agent.

Specific examples of the crystal nucleating agent (2) include metal salts of phenylphosphonic acids, such as zinc phenylphosphonate;

phthalocyanines, such as copper phthalocyanine crystals, titanyl phthalocyanine, aluminum phthalocyanine, vanadium phthalocyanine, cadmium phthalocyanine, antimony phthalocyanine, chromium phthalocyanine, germanium phthalocyanine, iron phthalocyanine, chloroaluminum phthalocyanine, chloroindium phthalocyanine, chlorogallium phthalocyanine, magnesium phthalocyanine, dialkyl phthalocyanine, tetramethyl phthalocyanine, tetraphenyl phthalocyanine, and a phthalocyanine compound containing a metal which may be substituted, such as a uranium complex having five isoindole rings (Superphthalocyanine) or a boron complex composed of three isoindole rings; metal salts of phosphoric esters, such as sodium 2,2'-methylenebis(4,6-di-t-butylphenyl) phosphate and aluminum bis(2,2'-methylenebis-4,6-di-t-butylphenyl phosphate); metal salts of dialkyl esters of aromatic sulfonic acids, such as dibarium dimethyl 5-sulfoisophthalate and dicalcium dimethyl 5-sulfoisophthalate; metal salts of rosin acids, such as potassium methyl dehydroabietate; aromatic carboxylic acid amides, such as tris(t-butylamide) trimesate, m-xylenebis 12-hydroxystearic amide, and 1,3,5-benzenetricarboxylic acid tricyclohexylamide; rosin amides, such as p-xylylenebisrosin amide; carbohydrazides, such as decamethylenedicarbonyl dibenzoyl hydrazide; N-substituted ureas, such as xylenebis stearylurea; salts of melamine compounds, such as melamine cyanurate; uracils, such as 6-methyluracil; and talc.

Among the above-mentioned crystal nucleating agents (2), the metal salts of phenylphosphonic acids are preferred, from the viewpoint of crystallization velocity. In addition, talc is preferred, from the viewpoint of heat resistance. The metal salt of a phenylphosphonic acid is a metal salt of a phenylphosphonic acid having a phenyl group which may have a substituent and a phosphoric group ($-PO(OH)_2$), wherein the substituent for the phenyl group includes an alkyl group having 1 to 10 carbon atoms, an alkoxycarbonyl group of which alkoxy group has 1 to 10 carbon atoms, and the like. Specific examples of the phenylphosphonic acid include unsubstituted phenylphosphonic acid, methylphenylphosphonic acid, ethylphenylphosphonic acid, propylphenylphosphonic acid, butylphenylphosphonic acid, dimethoxycarbonylphenylphosphonic acid, diethoxycarbonylphenylphosphonic acid, and the like, and the unsubstituted phenylphosphonic acid is preferred.

The metal salt of a phenylphosphonic acid includes salts of lithium, sodium, magnesium, aluminum, potassium, calcium, barium, copper, zinc, iron, cobalt, nickel, and the like, and the zinc salt is preferred.

These crystal nucleating agents can be used alone or in a combination of two or more kinds, so long as at least one kind is contained in the resin composition of the present invention.

In a case where two or more kinds are used in combination, a combination of the crystal nucleating agent (1) and the crystal nucleating agent (2) are preferred from the viewpoint of impact resistance and moldability of the resin composition, without being particularly limited thereto.

The weight ratio of the crystal nucleating agent (1) to the crystal nucleating agent (2), i.e. the crystal nucleating agent (1)/the crystal nucleating agent (2) is preferably from 20/80 to 80/20, more preferably from 30/70 to 70/30, and even more preferably from 40/60 to 60/40.

The crystal nucleating agent (B) is contained in a total amount of preferably from 0.1 to 5 parts by weight, more preferably from 0.5 to 3 parts by weight, and even more preferably from 0.5 to 2 parts by weight, based on 100 parts by weight of the polylactic acid resin (A), from the viewpoint of impact resistance and moldability of the resin composition. Here, the term "amount of . . . contained" as used herein means "an amount contained or an amount blended."

<Plasticizer (C)>

The plasticizer includes a plasticizer containing an ester compound formed between a polycarboxylic acid having a hydrocarbon group having 1 to 7 carbon atoms and a monoalcohol having a hydrocarbon group having 1 to 7 carbon atoms. From the viewpoint of plasticization efficiency, the plasticizer is preferably a compound having two or more ester groups in one molecule, in which at least one of the alcohol component constituting the ester is an adduct prepared by adding an alkylene oxide having 2 to 3 carbon atoms per one hydroxyl group in an amount of from 0.5 to 3.5 mol on average, and the plasticizer is more preferably a compound having two or more ester groups in one molecule, in which the alcohol component constituting the ester is an adduct prepared by adding an alkylene oxide having 2 to 3 carbon atoms per one hydroxyl group in an amount of from 0.5 to 3.5 mol on average, and the plasticizer is even more preferably a compound which is a polyhydric alcohol ester or a polycarboxylic acid ester having two or more ester groups in one molecule, in which at least one of the alcohol component constituting the ester is an adduct prepared by adding an alkylene oxide having 2 to 3 carbon atoms per one hydroxyl group in an amount of from 0.5 to 3.5 mol on average.

When the plasticizer is a compound having two or more ester groups in one molecule, in which at least one of the alcohol component constituting the ester is an adduct prepared by adding an alkylene oxide having 2 to 3 carbon atoms per one hydroxyl group in an amount of from 0.5 to 3.5 mol on average, its heat resistance, and compatibility with the polylactic acid resin are favorable. For this reason, bleeding resistance is improved, and at the same time an effect of making the polylactic acid resin flexible is also improved. Therefore, because of the improvement in making this polylactic acid resin flexible, it is considered that when the polylactic acid resin is crystallized, the growth velocity is also improved. As a result, it is considered that the resins can exhibit each of the properties, so that the resulting composition has excellent impact resistance.

If the above-mentioned plasticizer has two or more ester groups in one molecule, its compatibility with the polylactic acid resin becomes excellent, and it is preferable that the plasticizer has two to four ester groups in one molecule. In addition, if at least one of the alcohol component constituting the ester is an adduct prepared by adding an alkylene oxide having 2 to 3 carbon atoms per one hydroxyl group in an amount of 0.5 mol or more on average, sufficient plasticizing ability is imparted to the polylactic acid resin, and if the alkylene oxide added is an amount of 3.5 mol or less on average, an effect of bleeding resistance becomes favorable.

It is desired that the alcohol component constituting the ester in the above-mentioned compound is a compound by adding an alkylene oxide having 2 to 3 carbon atoms in an amount of preferably from 1 to 3.5 mol, more preferably from 2 to 3.0 mol, on average, per one hydroxyl group, from the viewpoint of compatibility with the polylactic acid resin, plasticizing efficiency, and volatility-resistance. In addition, it is preferable that the alkylene oxide is ethylene oxide, from the viewpoint of plasticizing efficiency. The number of carbon atoms of the hydrocarbon group, such as an alkyl group or an alkylene group, contained in the plasticizer, for example, the number of carbon atoms of the hydrocarbon group of the polyhydric alcohol or the polycarboxylic acid constituting the ester compound, is preferably from 1 to 8, more preferably from 1 to 7, even more preferably from 1 to 6, and even more preferably from 1 to 4, from the viewpoint of compatibility. Also, the number of carbon atoms of the hydrocarbon group of the monocarboxylic acid or the monoalcohol constituting the ester compound of the plasticizer is preferably from 1 to 8, more preferably from 1 to 7, even more preferably from 1 to 6, even more preferably from 1 to 4, and still even more preferably from 1 to 2, from the viewpoint of compatibility.

The ester compound having the above-mentioned structure is preferably a compound having two or more ester groups in one molecule, of which ethylene oxide moiety is added on average (total number) of from 3 to 7, more preferably at least one compound selected from the group consisting of ester compounds formed between succinic acid or adipic acid and polyethylene glycol monomethyl ether, and ester compounds formed between acetic acid and glycerol or an ethylene oxide adduct of ethylene glycol, and even more preferably an ester compound formed between succinic acid or adipic acid and polyethylene glycol monomethyl ether, from the viewpoint of moldability, plasticizing ability, and bleeding resistance.

In addition, the ester compound having the above structure may contain, on average, from 0 to 1.5 ester groups constituted by an aromatic alcohol, as the two or more ester groups in the ester compound, from the viewpoint of volatility-resistance. Since an aromatic alcohol has more excellent compatibility with the polylactic acid resin, as compared to an aliphatic alcohol having the same number of carbon atoms, the aromatic alcohol can increase the molecular weight, while maintaining bleeding resistance. In addition, it is preferable that the number of ester groups constituted by the aromatic alcohol is preferably from 0 to 1.2 ester groups, and more preferably from 0 to 1 ester groups, from the viewpoint of plasticizing efficiency. The aromatic alcohol includes benzyl alcohol, and the like, and the ester compound includes diester compounds formed between adipic acid and a 1/1 mixture of diethylene glycol monomethyl ether/benzyl alcohol, and the like.

The ester compound having the above-mentioned structure is preferably alkyl ether esters of polyhydric alcohols, such as an ester compound formed between acetic acid and an ethylene oxide adduct of glycerol, the ethylene oxide moiety of which is from 3 to 9 mol on average, an ester compound formed between acetic acid and a propylene oxide adduct of diglycerol, the propylene oxide moiety of which is from 4 to 12 mol on average, and an ester compound formed between acetic acid and a polyethylene glycol, the ethylene oxide moiety of which is 4 to 9 mol on average; and esters formed between polycarboxylic acids and polyethylene glycol monomethyl ethers, such as an ester compound formed between succinic acid and a polyethylene glycol monomethyl ether, the ethylene oxide moiety of which is 2 to 4 mol on average, an ester compound formed between adipic acid and a polyethylene glycol monomethyl ether, the ethylene oxide moiety of which is 2 to 3 mol on average, and an ester compound formed between 1,3,6-hexanetricarboxylic acid and a polyethylene glycol monomethyl ether, the ethylene oxide moiety of which is 2 to 3 mol on average, from the viewpoint of having excellent moldability and impact resistance of the resin composition. The ester compound is more preferably an ester compound formed between acetic acid and an ethylene oxide adduct of glycerol, the ethylene oxide moiety of which is 3 to 6 mol on average, an ester compound formed between acetic acid and a polyethylene glycol, the ethylene oxide moiety of which is 4 to 6 mol on average, an ester compound formed between succinic acid and a polyethylene glycol monomethyl ether, the ethylene oxide moiety of which is 2 to 3 mol on average, an ester compound formed between adipic acid and diethylene glycol monomethyl ether, and an ester compound formed between 1,3,6-hexanetricarboxylic acid and diethylene glycol monomethyl ether, from the viewpoint of having excellent moldability and impact resistance of the resin composition and bleeding resistance of the plasticizer. The ester compound is even more preferably an ester compound formed between succinic acid and triethylene glycol monomethyl ether, from the viewpoint of moldability and impact resistance of the resin composition and bleeding resistance, volatility-resistance, and resistance to irritable odor of the plasticizer.

These ester compounds can be used alone or in a combination of two or more kinds. In the present invention, it is preferable that the plasticizer (C) contains an ester compound formed between a polycarboxylic acid having a hydrocarbon group having 1 to 7 carbon atoms, and a mono-alcohol having a hydrocarbon group having 1 to 7 carbon atoms (also referred to as an ester compound I), from the viewpoint of affinity of the plasticizer with the polylactic acid resin and bleeding resistance. In addition, it is more preferable that the compound has two or more ester groups in one molecule, in which at least one kind of the alcohol component constituting the ester is a compound prepared by adding an alkyl oxide having 2 to 3 carbon atoms per one hydroxyl group in an amount of preferably from 0.5 to 3.5 mol, more preferably from 2 to 3.0 mol, on average (mono-alcohol).

The polycarboxylic acid having a hydrocarbon group having 1 to 7 carbon atoms is exemplified by isophthalic acid, terephthalic acid, malic acid, citric acid, oxalic acid, malonic acid, succinic acid, maleic acid, fumaric acid, and adipic acid. Among them, adipic acid, succinic acid, and phthalic acid are preferred, from the viewpoint of improving impact resistance of the resin composition.

The mono-alcohol having a hydrocarbon group having 1 to 7 carbon atoms is not particularly limited, and the mono-alcohol is preferably benzyl alcohol, diethylene glycol monomethyl ether, and triethylene glycol monomethyl ether, from the viewpoint of improving impact resistance of the resin composition.

As the combinations of the polycarboxylic acid having a hydrocarbon group having 1 to 7 carbon atoms, and the mono-alcohol having a hydrocarbon group having 1 to 7 carbon atoms, those selected from adipic acid and succinic acid as the polycarboxylic acid and triethylene glycol monomethyl ether and benzyl alcohol as the mono-alcohol are preferred, from the viewpoint of impact resistance of the resin composition.

As the ester compounds obtainable from the raw materials, an ester formed between succinic acid and triethylene glycol monomethyl ether, and dibenzyl adipate are preferred, from the viewpoint of improving impact resistance of the resin composition.

The method for producing the above-mentioned plasticizer is not particularly limited. For example, in a case where the plasticizer usable in the present invention is a polycarboxylic acid ether ester, an intended product is obtained by directly reacting a saturated dibasic acid having 3 to 5 carbon atoms or an anhydride thereof and a polyalkylene glycol monoalkyl ether, or carrying out transesterification between a lower alkyl ester of a saturated dibasic acid having 3 to 5 carbon atoms and a polyalkylene glycol monoalkyl ether, each in the presence of an acid catalyst such as paratoluenesulfonic acid monohydrate or sulfuric acid, or a metal catalyst such as dibutyltin oxide. Specifically, an intended product can be obtained by, for example, charging a reaction vessel with a polyethylene glycol monoalkyl ether, a saturated dibasic acid, and paratoluenesulfonic acid monohydrate as a catalyst so as to have a ratio of polyethylene glycol monoalkyl ether/saturated dibasic acid/paratoluenesulfonic acid monohydrate (molar ratio) of from 2-4/1/0.001-0.05, and subjecting the mixture to dehydration under a normal pressure or reduced pressure at a temperature of from 100° to 130° C. in the presence or absence of a solvent such as toluene. A method of carrying out the reaction under a reduced pressure without a solvent is preferred.

In addition, in a case where the plasticizer usable in the present invention is a polyhydric alcohol ester, for example, an alkylene oxide having 2 to 3 carbon atoms is added to glycerol in an amount of from 3 to 9 mol per one mol of glycerol, using an autoclave at a temperature of from 120° to 160° C. in the presence of an alkali metal catalyst. To one mol of the alkylene oxide adduct of glycerol thus obtained is added dropwise 3 mol of acetic anhydride at 110° C., and the mixture is aged at 110° C. for 2 hours after the termination of dropwise addition, to acetylate the compound. An intended product can be obtained by subjecting the reaction product to steam distillation under a reduced pressure, to distill off acetic acid and unreacted acetic anhydride contained.

In addition, when the plasticizer usable in the present invention is a hydroxycarboxylic acid ether ester, an alkylene oxide having 2 to 3 carbon atoms is added to a hydroxycarboxylic acid such as lactic acid in an amount of from 2 to 5 mol per one mol of the hydroxycarboxylic acid, using an autoclave at a temperature of from 120° to 160° C. in the presence of an alkali metal catalyst. To one mol of the alkylene oxide adduct of lactic acid thus obtained is added dropwise 1 mol of acetic anhydride at 110° C., and the mixture is aged at 110° C. for 2 hours after the termination of dropwise addition, to acetylate the compound. The reaction product is subjected to steam distillation under a reduced pressure, to distill off acetic acid and unreacted acetic anhydride contained. Next, an intended product can be obtained by charging the ingredients into a reaction vessel so as to have a ratio of the resulting product/polyalkylene glycol monoalkyl ether/para-toluenesulfonic acid monohydrate (catalyst) (molar ratio) of from 1/1-2/0.001-0.05, and subjecting the mixture to dehydration at a temperature of from 100° to 130° C. under a normal pressure or reduced pressure, in the presence or absence of a solvent such as toluene.

The plasticizer has an average molecular weight of preferably from 250 to 700, more preferably from 300 to 600, even more preferably from 320 to 600, even more preferably from 350 to 550, and even more preferably from 400 to 500, from the viewpoint of bleeding resistance and volatility-resistance. Here, the average molecular weight can be obtained by obtaining a saponification value in accordance with a method prescribed in JIS K0070, and calculating the average molecular weight according to the following formula:

$$\text{Average Molecular Weight} = 56,108 \times \frac{\text{Number of Ester Groups}}{\text{Saponification Value}}$$

Here, it is preferable that the above-mentioned ester is a saturated ester where all the groups relating to esterification are reacted, from the viewpoint of sufficiently exhibiting its function as a plasticizer.

The plasticizer (C) is contained in an amount of preferably from 50 to 100% by weight, more preferably from 70 to 100% by weight, and even more preferably from 90 to 100% by weight, of the ester compound I, from the viewpoint of improving impact resistance of the resin composition.

In addition, the plasticizer (C) in the resin composition of the present invention is contained in an amount of preferably from 5 to 30 parts by weight, more preferably from 7 to 30 parts by weight, and even more preferably from 10 to 30 parts by weight, based on 100 parts by weight of the polylactic acid resin (A), from the viewpoint of obtaining sufficient crystallization velocity and impact resistance.

In the present invention, the raw material A used in the melt-kneading of the step A may contain, in addition to those mentioned above, an additive such as a filler or a hydrolysis inhibitor.

The filler is preferably blended from the viewpoint of obtaining a resin composition excellent in such properties as mechanical properties, moldability and heat resistance, and the filler in the form of fibers, plates, granules, or powders, that are ordinarily usable as a filler for the thermoplastic resin composition, can be used. Specifically, the filler includes silicates, such as smectite, kaolin, mica, and montmorillonite; inorganic compounds, such as silica, magnesium oxide, titanium oxide, and calcium carbonate; fibrous inorganic fillers such as glass fiber, carbon fiber, graphite fiber, wollastonite, potassium titanate whisker, and silicon-containing whisker, organic fillers such as nylon fiber and acrylic fiber; and the like.

The filler is contained in an amount of preferably from 1 to 300 parts by weight, and more preferably from 5 to 150 parts by weight, based on 100 parts by weight of the polylactic acid resin (A), from the viewpoint of obtaining sufficient heat resistance and impact resistance.

The hydrolysis inhibitor includes carbodiimide compounds, such as polycarbodiimide compounds and monocarbodiimide compounds. The monocarbodiimide compounds are preferred, from the viewpoint of moldability of the resin composition, and the polycarbodiimide compounds are preferred, from the viewpoint of heat resistance and impact resistance of the resin composition, and bleeding resistance of the crystal nucleating agent.

The polycarbodiimide compound includes poly(4,4'-diphenylmethanecarbodiimide), poly(4,4'-dicyclohexylmethanecarbodiimide), poly(1,3,5-triisopropylbenzene) polycarbodiimide, poly(1,3,5-triisopropylbenzene and 1,5-diisopropylbenzene)polycarbodiimide, and the like. The monocarbodiimide compound includes N,N'-di-2,6-diisopropylphenylcarbodiimide, and the like.

In order to satisfy moldability, heat resistance, and impact resistance of the resin composition and bleeding resistance of the crystal nucleating agent, the above carbodiimide compounds may be used alone or in a combination of two or more kinds. In addition, as the poly(4,4'-dicyclohexylmethanecarbodiimide), Carbodilite LA-1 (manufactured by Nisshin Boseki) can be purchased and used; as the poly(1,3,5-triisopropylbenzene)polycarbodiimide and poly(1,3,5-triisopropylbenzene and 1,5-diisopropylbenzene)polycarbodiimide, Stabaxol P and Stabaxol P-100 (manufactured by Rhein Chemie) can be purchased and used; and as N,N'-di-2,6-diisopropylphenylcarbodiimide, Stabaxol 1-LF (manufactured by Rhein Chemie) can be purchased and used.

The hydrolysis inhibitor is contained in an amount of preferably from 0.05 to 15 parts by weight, more preferably from 0.10 to 10 parts by weight, and even more preferably from 0.20 to 10 parts by weight, based on 100 parts by weight of the polylactic acid (A), from the viewpoint of hydrolysis inhibition of the polylactic acid resin.

In addition, in the present invention, the resin composition may be blended with, besides the above-mentioned additives, additives such as a carboxyl group-reactive compound, a stabilizer such as an antioxidant or an ultraviolet absorbent, a lubricant, a mold releasing agent, a colorant including a dye and a pigment, or an antistatic agent, as a raw material for the composition, within the range that would not impair the achievement of the purpose of the present invention.

In the step A, a raw material A containing the polylactic acid resin (A), a crystal nucleating agent (B) and a plasticizing agent (C) mentioned above, and further optionally various kinds of additives is melt-kneaded, to prepare a polylactic acid-containing melt-kneaded mixture having a relative crystallinity of 70% or more. So long as these raw materials are mixed, melt-kneading can be carried out in accordance with a conventional method, and the melt-kneaded mixture would show a relative crystallinity of 70% or more.

As the melt-kneader usable in the step A, a known melting kneader, such as a single-screw or twin-screw extruder, a Banbury mixer, a kneader, or a mixing roller can be used. Among them, the twin-screw extruder is preferred, from the viewpoint of homogeneous kneading of the raw material A.

Specific embodiments for the melt-kneading in the step A include, for example, an embodiment of kneading a crystal nucleating agent (B), a plasticizer (C), and various additives, while melting a polylactic acid resin (A) using a twin-screw kneader through which two screws are inserted, or the like.

The melt-kneading temperature of the step A is preferably equal to or higher than a melting point (Tm) (° C.) of the polylactic acid, more preferably a temperature calculated in the range of from Tm to Tm+100(° C.), and even more preferably a temperature calculated in the range of from Tm+50(° C.), from the viewpoint of dispersibility of the crystal nucleating agent. Specifically, the melt-kneading temperature is preferably from 170° to 220° C., more preferably from 170° to 210° C., and even more preferably from 170° to 200° C.

Here, in order to even further increase a relative crystallinity of the resulting melt-kneaded mixture, it is preferable that the melt-kneaded mixture, after the melt-kneading, is kept in a liquid medium at a temperature of preferably from 15° to 40° C., more preferably from 20° to 40° C., and even more preferably from 25° to 30° C., for preferably from 0.5 to 10 seconds, and more preferably 1 to 10 seconds.

Here, the liquid medium is a low-viscosity liquid having a boiling point of 100° C. or higher, for example, water, ethylene glycol, silicone oil, or the like, and water is preferred from the viewpoint of safety and handling property. The liquid medium can be stably kept at a certain temperature by circulating with a temperature-controlling instrument, or the like.

Thus, according to the step A, a polylactic acid-containing melt-kneaded mixture having a relative crystallinity of 70% or more, in which the crystal nucleating agent (B) and the plasticizer (C) are well dispersed in the polylactic acid resin (A) is obtained (hereinafter also referred to as the melt-kneaded mixture of the step A).

The melt-kneaded mixture of the step A has a relative crystallinity of 70% or more, preferably from 80 to 95%, and more preferably from 90 to 95%. Here, in the melt-kneaded mixture having a relative crystallinity in the range as mentioned above, the crystal nucleating agent (B) and the plasticizer (C) are well dispersed in the polylactic acid resin (A). The relative crystallinity as used herein is measured by a method described in Examples set forth below.

Next, a melt-kneaded mixture having a relative crystallinity of 70% or more obtained by the step A (also referred to as a melt-kneaded mixture of the step A, or a modified polylactic acid resin) is subjected to the melt-kneading of the step B.

The melt-kneading of the step B includes the step of melt-kneading a melt-kneaded mixture of the step A and a raw material raw material B containing a polypropylene resin (D) and a compatibilizing agent (E).

<Polypropylene Resin (D)>

The polypropylene resin is a polymer containing propylene as a main constituting component, and contains propylene in an amount of preferably 80% or more, and more preferably 90% or more.

The constituents other than propylene include ethylene or α-olefins without any substituents having 4 to 20 carbon atoms, including specifically 1-butene, 1-pentene, 1-hexene, 1-octene, 1-decene, 1-dodecene, 1-tetradecene, 1-hexadecene, 1-octadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, and the like. These constituents can be used alone or in a combination of two or more kinds.

The polymerization of propylene, and the polymerization of propylene with other components are not particularly limited, and the polymerizations can be carried out using known methods. For example, any methods such as radical polymerization, coordination polymerization using a Ziegler-Natta catalyst, anionic polymerization, or a coordination polymerization using a metallocene catalyst can be employed.

The polypropylene resin has a melting point (° C.) of preferably from 140° to 200° C., more preferably from 150° to 190° C., and even more preferably from 160° to 180° C., from the viewpoint of moldability and impact resistance of the resin composition.

In addition, the polypropylene resin has a melt flow rate (MFR) of preferably from 1 to 100 g/10 minutes, more preferably from 10 to 60 g/10 minutes, and even more preferably from 20 to 50 g/10 minutes, from the viewpoint of moldability and impact resistance of the resin composition. The melt flow rate (MFR) as used herein is measured by a method described in Examples set forth below.

The polypropylene resin can be synthesized by the method mentioned above, and as a commercially available manufactured article, for example, BC03B, BC03C, or BC05B (manufactured by Japan Polychem Corporation), J707EG, J830HV, and J708UG (manufactured by Prime Polymer Co., Ltd.), or the like is suitably used.

The polypropylene resin (D) is contained, but not particularly limited to, in an amount of preferably from 30 to 90% by weight, more preferably from 40 to 80% by weight, and even more preferably from 50 to 80% by weight, of the resin composition.

The weight ratio of the polylactic acid resin (A) to the polypropylene resin (D), i.e. the polylactic acid resin (A)/the polypropylene resin (D), in the resin composition is preferably from 10/90 to 60/40, more preferably from 10/90 to 50/50, and even more preferably from 10/90 to 40/60.

Here, the resin composition according to the present invention may contain other resins besides the polylactic acid resin (A) and the polypropylene resin (D) mentioned above properly within the range so as not to impair the effects of the present invention. Other resins include polybutylene succinate, polyhydroxyalkanoic acid, and the like. The polylactic acid resin (A) and the polypropylene resin (D) are contained in a total amount of preferably 50% by weight or more, more preferably 80% by weight or more, and even more preferably 90% by weight or more, of the resins usable in the resin composition, from the viewpoint of impact resistance of the resin composition.

<Compatibilizing Agent (E)>

In the present invention, since the resin composition contains a compatibilizing agent, affinity of the polylactic acid resin and the polypropylene resin is improved, so that the phase structure is likely to be easily controlled, whereby a resin composition having excellent impact resistance can be obtained.

The compatibilizing agent is not particularly limited, so long as the compatibilizing agent has affinity to the polylactic acid resin and the polypropylene resin mentioned above, and preferred are:

a compatibilizing agent (1): an ethylene/vinyl acetate copolymer;
a compatibilizing agent (2): an ethylene/(meth)acrylic ester copolymer;
a compatibilizing agent (3): a polyolefin resin having at least one functional group (substituent) selected from the group consisting of an acid anhydride group, a carboxyl group, an amino group, an imino group, an alkoxysilyl group, a silanol group, a silyl ether group, a hydroxyl group, and an epoxy group;
a compatibilizing agent (4): an acrylic resin or styrenic resin having at least one functional group (substituent) selected from the group consisting of an acid anhydride group, a carboxyl group, an amino group, an imino group, an alkoxysilyl group, a silanol group, a silyl ether group, a hydroxyl group, and an epoxy group;
a compatibilizing agent (5): a polyester resin; and
a compatibilizing agent (6): an ionomer resin, from the viewpoint of impact resistance of the resin composition. In addition, the compatibilizing agent (3), the compatibilizing agent (4), and the compatibilizing agent (5) are more preferred, from the viewpoint of stability in the phase structure. A polyolefin resin having an epoxy group, a polyester resin, and a styrenic resin having a carboxyl group are even more preferred, from the viewpoint of impact resistance of the resin composition.

Preferred examples of the compatibilizing agent (1) include "EVAFLEX EVA" manufactured by DUPONT-MITSUI POLYCHEMICALS CO., LTD., "LEVAPREN," manufactured by LANXESS, "EVATATE" manufactured by SUMITOMO CHEMICAL CO., LTD., "Ultracen" manufactured by Tosoh Corporation, "NOVATEC" manufactured by Japan Polyethylene Corporation, "NUC EVA Copolymer" manufactured by Nippon Unicar Co., Ltd., and the like.

Preferred examples of the compatibilizing agent (2) include "Lotryl" manufactured by ARKEMA, "EVAFLEX EEA" manufactured by DUPONT-MITSUI POLYCHEMICALS CO., LTD., "Acryft" manufactured by SUMITOMO CHEMICAL CO., LTD., "NUC EEA Copolymer" manufactured by Nippon Unicar Co., Ltd., and the like.

Preferred examples of the compatibilizing agent (3) include "Bond Fast 7M" manufactured by SUMITOMO CHEMICAL CO., LTD. (polyethylene having an epoxy group), "REXPEARL" manufactured by Japan Polyethylene Corporation (polyolefin resin having an epoxy group), "MODIPER" manufactured by NOF CORPORATION (polyolefin resin having an epoxy group), "Umex" manufactured by Sanyo Chemical Industries, Ltd. (polyolefin resin having an acid anhydride group), "Orevac" manufactured by ARKEMA (polyolefin resin having an acid anhydride group), "LOTADER" manufactured by ARKEMA (polyolefin resin having an acid anhydride group), "BONDYNE" manufactured by SUMITOMO CHEMICAL CO., LTD. (polyolefin resin having an acid anhydride group), "NUCREL" manufactured by DUPONT-MITSUI POLYCHEMICALS CO., LTD. (polyolefin resin having a carboxyl group), "PRIMACOR" manufactured by Dow Chemical Company (polyolefin resin having a carboxyl group), and the like.

Preferred examples of the compatibilizing agent (4) include "ARUFON" manufactured by TOAGOSEI CO., LTD. (acrylic resin or styrenic resin having an epoxy group), "JONCRYL" manufactured by "Tuftec M1913" manufactured by Asahi Kasei Corporation (acrylic resin or styrenic resin having a carboxyl group), and the like.

Preferred examples of the compatibilizing agent (5) include "Plamate PD-350" manufactured by DIC (PLA-aliphatic polyester copolymer), and the like.

The ionomer resin of the compatibilizing agent (6) means a resin having a special structure in which molecules of ethylene-methacrylic acid copolymers or ethylene-acrylic acid copolymers are subjected to intermolecular bonding with a metal ion. In the present invention, a metal species is preferably at least one member selected from the group consisting of calcium and zinc, and more preferably zinc, from the viewpoint of moldability, impact resistance, and heat resistance of the resin composition. Preferred examples of the ionomer resin include "HIMILAN" manufactured by DUPONT-MITSUI POLYCHEMICALS CO., LTD. (metal species: sodium or zinc), "ACLYN" manufactured by Honeywell (metal species: sodium or magnesium), and the like.

These compatibilizing agents can be used alone or in a combination of two or more kinds.

The compatibilizing agent has a melt flow rate (MFR) of preferably from 3 to 15 g/10 minutes, and more preferably from 5 to 10 g/10 minutes, from the viewpoint of impact resistance and moldability of the resin composition.

The compatibilizing agent (E) is contained in an amount of preferably from 1 to 30 parts by weight, more preferably from 1 to 20 parts by weight, and even more preferably from 1 to 10 parts by weight, based on 100 parts by weight of a total amount of the polylactic acid resin (A) and the polypropylene resin (D), from the viewpoint of impact resistance and moldability of the resin composition.

In the present invention, the raw material B used in the melt-kneading of the step B may also further be blended with and contain, in addition to the additives mentioned above, a flame retardant, or the like.

The flame retardant is preferably a phosphorus-containing flame retardant, and more preferably at least one member selected from condensed phosphate esters, salts of phosphoric acid, and salts of condensed phosphoric acid, from the viewpoint of improving flame retardant property of the resin composition. The flame retardant is contained in an amount preferably from 10 to 60 parts by weight, and more preferably from 15 to 55 parts by weight, based on 100 parts by weight of a total amount of the polylactic acid resin (A) and the polypropylene resin (D).

In the melt-kneading of the step B, the melt-kneaded mixture of the step A and a raw material B containing a polypropylene resin (D) and a compatibilizing agent (E) are melt-kneaded, and a method of melt-kneading is not particularly limited, so long as these raw materials are mixed, and is exemplified by the same methods as those in the melt-kneading in the step A.

The melt-kneader usable in the step B includes the same melt kneader as that in the step A, among which a twin-screw extruder is preferred, from the viewpoint of stability in the phase structure and impact resistance of the resulting resin composition.

Specific embodiments of the melt-kneading in the step B include, for example, a method of kneading a polypropylene resin (D) and a compatibilizing agent (E), while melting a melt-kneaded mixture of the step A using a twin-screw kneader through which two screws are inserted, or the like.

The melt-kneading temperature of the step B is preferably from 160° to 210° C., more preferably from 170° to 200° C., and even more preferably from 170° to 190° C., from the viewpoint of improvement in impact resistance and stability in the phase structure of the resulting resin composition.

Thus, according to the method of the present invention, a resin composition having excellent impact resistance, which is an alloy polymer of a polylactic acid resin and a polypropylene resin is obtained. Therefore, the present invention also provides a resin composition obtainable by the method of the present invention.

Since the resin composition of the present invention has excellent workability, for example, workable at a low temperature of 200° C. or lower, the resin composition has an advantage that the degradation of the plasticizer is less likely to take place, so that the resin composition can be molded into films and sheets, to be used in various applications.

[Resin Molded Article]

The resin molded article of the present invention is obtained by injection-molding a resin composition obtainable by the method of the present invention. Specifically, for example, while melting a polylactic acid resin (A) with an extruder or the like, a crystal nucleating agent (B) and a plasticizer (C), and, as occasion demands, an additive such as a filler is mixed, a polypropylene resin (D) and a compatibilizing agent (E) are further mixed therewith, and a molten mixture obtained is filled in a die with an injection molding machine or the like to mold.

A preferred method for producing a resin molded article of the present invention is a method including the steps of melt-kneading a resin composition containing a polylactic acid resin, a polypropylene resin, a crystal nucleating agent, a plasticizing agent and a compatibilizing agent (hereinafter referred to as step (1)); and filling a molten composition obtained in step (1) in a die at a temperature of 110° C. or less to mold (hereinafter referred to as step (2)).

Specific examples of step (1) include, for example, a method including the step of while melting a polylactic acid resin (A) with an extruder or the like, melt-kneading a crystal nucleating agent (B) and a plasticizer (C), i.e. the melting kneading of the step A, and further melt-kneading a polypropylene resin (D) and a compatibilizing agent (E) therewith, i.e. the melt-kneading of the step B, and the like. The melt-kneading temperature of the step A is preferably from 170° to 220° C., more preferably from 170° to 210° C., and even more preferably from 170° to 200° C., from the viewpoint of dispersibility of the crystal nucleating agent, and the melt-kneading temperature of the step B is preferably from 160° to 210° C., more preferably from 170° to 200° C., and even more preferably from 170° to 190° C., from the viewpoint of improving impact resistance and having stability in the phase structure of the resulting resin composition. Here, after the melt-kneading of the step A, it is preferable that the method further includes the step of keeping the melt-kneaded mixture of the step A in a liquid medium at a temperature of preferably from 15° to 40° C., more preferably from 20° to 40° C., and even more preferably from 25° to 30° C. for preferably from 0.5 to 10 seconds, and more preferably from 1 to 10 seconds, from the viewpoint of increasing a relative crystallinity of the melt-kneaded mixture of the step A.

Specific examples of step (2) include, for example, the step of filling a resin composition in a die at a temperature of 110° C. or less with an injection molding machine or the like to mold, and the like. The die temperature in step (2) is preferably 110° C. or less, more preferably 90° C. or less, and even more preferably 80° C. or less, from the viewpoint of improving crystallization velocity, improving flowability of the resin composition, satisfying both flexibility and rigidity, and improving operability. Also, the die temperature is preferably 30° C. or more, more preferably 40° C. or more, and even more preferably 60° C. or more. From these viewpoints, the die temperature is preferably from 40° to 110° C., more preferably from 40° to 90° C., and even more preferably from 60° to 80° C.

EXAMPLES

The following examples further describe and demonstrate embodiments of the present invention. The examples are given solely for the purposes of illustration and are not to be construed as limitations of the present invention.

[Optical Purity of Polylactic Acid Resin]

The optical purity of a polylactic acid resin can be obtained in accordance with the measurement method for D-form content described in "*Poriorefin-toh Gosei-jushi-sei Shokuhin Youki Houso-toh ni Kansuru Jishukijun (Self-Standards Concerning Food Containers and Wrappings Made of Synthetic Resins Such as Polyolefins)*," Revised Third Edition, supplemented in June, 2004, Chapter 3 Eisei Shikenho (Hygienic Test Method), p. 12-13."

First, sodium hydroxide in methanol is added to an accurately weighed polylactic acid, and a mixture is set in a water bath shaking machine set at 65° C., and allowed to be hydrolyzed until the resinous components are formed into a homogeneous solution. Further, a diluted hydrochloric acid is added to an alkaline solution after hydrolysis is completed to neutralize, and the hydrolyzed solution is diluted to a certain volume with pure water. Thereafter, a given volume of the dilution is separated in a volumetric flask, and the separated solution is diluted with a mobile phase solution for high-performance liquid chromatography (HPLC). The pH of the dilution is adjusted to a range of from 3 to 7, and the dilution in the volumetric flask is quantified, and filtered with a membrane filter (0.45 µm). The resulting prepared solution is quantified for D-lactic acid and L-lactic acid in accordance with HPLC under the measurement conditions shown below, whereby optical purity of the polylactic acid resin can be obtained.

<Measurement Conditions>
Column: SUMICHIRAL OA6100 (46 minφ×150 mm, 5 μm), manufactured by Sumika Chemical Analysis Service, Ltd.
Pre-Column: SUMICHIRAL QA6100 (4 mmφ×10 mm, 5 μm), manufactured by Sumika Chemical Analysis Service, Ltd.
Column Temperature: 25° C.
Mobile Phase: 2.5% Methanol-containing 1.5 mM aqueous copper sulfate solution
Flow Rate of Mobile Phase: 1.0 mL/minute
Detector: Ultraviolet Detector (UV 254 nm)
Amount of Injection: 20 μL

[Melting Points of Polylactic Acid Resins and Polypropylene Resin]

The melting points of the resins are obtained from an endothermic peak temperature of melt crystallization according to a heating method for measuring differential scanning calorimetry as prescribed in JIS-K7121 (DSC; Diamond DSC, manufactured by Perkin-Elmer). The melting point is measured by heating from 20° to 250° C. at a heating rate of 10° C./minute.

[Glass Transition Temperatures of Polylactic Acid Resins]

The glass transition temperature of the polylactic acid resin is a value obtained from a peak temperature of loss modulus (E") in dynamic viscoelasticity measurement (DMS; DMS 6100, manufactured by Seiko Instruments Inc.). The dynamic viscoelasticity measurement is taken by heating a sample from −100° to 150° C. at a heating rate of 2° C./minute.

[Melting Points of Crystal Nucleating Agents]

The melting point is measured with a DSC apparatus (Diamond DSC, manufactured by Perkin-Elmer) by heating a sample from 20° to 500° C. at a heating rate of 10° C./minute.

[Average Molecular Weights of Plasticizers]

The average molecular weight is obtained by obtaining a saponification value according to a method as prescribed in JIS K0070, and calculating an average molecular weight according to the following formula:

$$\text{Average Molecular Weight} = 56{,}108 \times \frac{\text{Number of Ester Groups}}{\text{Saponification Value}}$$

[Weight-Average Molecular Weights (Mw) of Polypropylene Resins]

The weight-average molecular weight (Mw) is measured in accordance with GPC (Gel Permeation Chromatography) under the following measurement conditions.
<Measurement Conditions>
Column: GMHHR-H+GMHHR-H
Column Temperature: 40° C.
Detector: RI
Eluent: Chloroform
Flow Rate: 1.0 mL/min
Concentration of Sample: 1 mg/mL
Amount Injected: 0.1 mL
Conversion Standard: Polystyrene

[Melt Flow Rates (MFR) of Polypropylene Resins and Compatibilizing Agent]

The melt flow rate (MFR) is measured in accordance with a method as prescribed in JIS K7210. Here, the melt flow rate for the polypropylene resin is measured under the conditions of 230° C. and a load of 21.2 N, and that for the compatibilizing agent is measured under the conditions of 190° C. and a load of 21.2 N.

[Relative Crystallinity of Melt-Kneaded Mixture]

The relative crystallinity is measured in accordance with the following method. Specifically, the melt-kneaded mixture subjected to strand cutting after the termination of the step A is dried so as to have a moisture content of 500 ppm or less, a dried mixture is pulverized, and 7.5 mg of a pulverized product is accurately weighed and encapsulated in an aluminum pan. Using a DSC apparatus (Diamond DSC, manufactured by Perkin-Elmer), the 1st RUN includes heating from 20° to 200° C. at a heating rate of 20° C./minute, keeping at 200° C. for 5 minutes, cooling from 200° to 20° C. at a cooling rate of −20° C./minute, and keeping at 20° C. for 1 minute, and further, the 2nd RUN includes heating from 20° to 200° C. at a heating rate of 20° C./minute. Using ΔHcc, which is an absolute value of a cold crystallization enthalpy of a polylactic acid resin observed in 1st RUN, and ΔHm, a melt crystallization enthalpy observed in 2nd RUN, the relative crystallinity can be calculated by the following formula:

Relative Crystallinity (%)=(ΔHm−ΔHcc)/ΔHm×100

Production Example 1 of Plasticizer (Dibenzyl Adipate

A 3 L flask equipped with a stirrer, a thermometer, and a dehydration tube was charged with 438 g of adipic acid, 779 g of benzyl alcohol, and 5.7 g of paratoluenesulfonic acid monohydrate, and the components were reacted at 120° C. for 4 hours under a reduced pressure of from 6 to 10.7 kPa, while blowing nitrogen (500 mL/minute) into a space portion. The reaction mixture had an acid value of 1.2 (KOH mg/g). Eight grams of an adsorbent KYOWAAD 500SH (manufactured by Kyowa Kagaku Kogyo) was added to the reaction mixture, and the mixture was stirred at 80° C. and 2.7 kPa for 45 minutes. Thereafter, benzyl alcohol was distilled off at a liquid temperature of from 120° to 183° C. and a pressure of 0.27 kPa, and cooled to 80° C., and the residue was filtered under a reduced pressure, to provide dibenzyl adipate as a filtrate. The resulting dibenzyl adipate had an acid value of 0.16 (KOH mg/g), a saponification value of 512 (KOH mg/g), a hydroxyl value of 1 or less (KOH mg/g), and a hue APHA of 80.

Production Example 2 of Plasticizer (Diester Compound Formed Between Succinic Acid and Triethylene Glycol Monomethyl Ether)

A 3 L flask equipped with a stirrer, a thermometer, and a dehydration tube was charged with 500 g of succinic anhydride, 2463 g of triethylene glycol monomethyl ether, and 9.5 g of paratoluenesulfonic acid monohydrate, and the components were reacted at 110° C. for 15 hours under a reduced pressure of from 4 to 10.7 kPa, while blowing nitrogen (500 mL/minute) into a space portion. The reaction mixture had an acid value of 1.6 (KOH mg/g). Twenty-seven grams of an adsorbent KYOWAAD 500SH (manufactured by Kyowa Kagaku Kogyo) was added to the reaction mixture, and the mixture was stirred at 80° C. and 2.7 kPa for 45 minutes, and filtered. Thereafter, triethylene glycol monomethyl ether was distilled off at a liquid temperature of from 115° to 200° C. and a pressure of 0.03 kPa, and cooled to 80° C., and the residue was filtered under a reduced pressure, to provide a diester compound formed between succinic acid and triethylene glycol monomethyl ether as a filtrate. The resulting diester had an acid value of 0.2 (KOH mg/g), a saponification value of 276 (KOH mg/g), a hydroxyl value of 1 or less (KOH mg/g), and a hue APHA of 200.

Examples 1 to 11 and Comparative Examples 1 to 10

Raw materials listed in First Kneading in Table 1, 2, or 3 as raw materials were melt-kneaded with a twin-screw extruder (PCM-45, manufactured by Ikegai Corporation) at a first melt-kneading temperature shown in Table 1, 2, or 3 at a rate of 100 r/min, and the resulting melt-kneaded mixture was kept in water at 25° C. for 1 second, to prepare a polylactic acid-containing melt-kneaded mixture (modified polylactic acid resin composition, modified PLA) having a relative crystallinity as shown in Table 1 (step A). Subsequently, raw materials listed in Second Kneading in Table 1, 2, or 3 were further melt-kneaded with the twin-screw extruder at a second melt-kneading temperature shown in Table 1, 2, or 3 at a rate of 100 r/min (step B), and the melt-kneaded mixture was subjected to strand-cutting, to provide pellets of a resin composition. The resulting pellets were dried at 80° C. under a reduced pressure for one day, so that a moisture content was 500 ppm or less. Here, in a case where there are no materials to be blended in the second kneading, the raw materials were simultaneously fed in the first kneading, and the mixture was melt-kneaded at a first melt-kneading temperature shown in Table 1, 2, or 3 at a rate of 100 r/min, to provide pellets.

The properties of the resulting pellets were examined in accordance with the methods of the following Test Examples 1 and 2. The results are shown in Tables 1 to 3.

Test Example 1

Impact Resistance

Each of the pellets was injection-molded with an injection molding machine (J75E-D, manufactured by The Japan Steel Works, Ltd.), of which cylinder temperature was controlled to 200° C., and the pellets were molded into test pieces [rectangular test pieces (63 mm×12 mm×5 mm)] at a die temperature of 30° C. and a molding time of 1 minute. Izod impact strength (J/m) was measured for each of the resulting rectangular test pieces using an impact tester (Model 863, manufactured by Ueshima Seisakusho Co., Ltd.) as prescribed in JIS K7110. The higher the Izod impact strength (J/m), the more excellent the impact resistance.

Test Example 2

Heat Resistance

Each of the pellets was injection-molded with an injection molding machine (J75E-D, manufactured by The Japan Steel Works, Ltd.), of which cylinder temperature was controlled to 200° C., and the pellets were molded into test pieces [rectangular test pieces (123 mm×13 mm×7 mm)] at a die temperature of 30° C. and a molding time of 1 minute.

HDT heat resistance (° C.) was measured for each of the resulting rectangular test pieces using a heat distortion tester (Model No. 148-HD46, manufactured by YASUDA SEIKI SEISAKUSHO LTD.) as prescribed in JIS K7207. The higher the HDT heat resistance (° C.), the more excellent the heat resistance.

Here, the raw materials in Tables 1 to 3 are follows. In addition, as to a plasticizer an ester compound, raw material carboxylic acid and alcohol therefor are listed in Table 4.
[Polypropylene Resin]
BC03B: Polypropylene resin (manufactured by Japan Polychem Corporation, MFR: 30 g/10 minute, melting point: 170° C., weight-average molecular weight: 142,000)
[Polylactic Acid Resin]
LACEA H-400: Polylactic acid resin (manufactured by Mitsui Chemicals, Inc., melting point: 166° C., glass transition temperature: 62° C., optical purity: 98%)
[Plasticizer]
Dibenzyl adipate: A diester compound formed between adipic acid and benzyl alcohol prepared in the above-mentioned Production Example, average molecular weight: 326
DAIFATY-101: A diester compound formed between adipic acid and a (1/1) mixture of diethylene glycol monomethyl ether and benzyl alcohol, manufactured by DAIHACHI CHEMICAL INDUSTRY CO., LTD., average molecular weight: 338.4
(MeEO$_3$)$_2$SA: A diester compound formed between succinic acid and triethylene glycol monomethyl ether prepared in the above-mentioned Production Example, average molecular weight: 410
N-DOP: Di-2-ethylhexyl phthalate, manufactured by Kao Corporation (trade name: VINYCIZER 80), average molecular weight: 234
VINYCIZER 50: Isodecyl adipate, manufactured by Kao Corporation, average molecular weight: 213
[Crystal Nucleating Agent]
SLIPAX H: Ethylenebis-12-hydroxystearic amide, manufactured by Nippon Kasei Chemical Co., Ltd., melting point: 143° C., molecular weight: 353.0
ECOPROMOTE: Zinc salt of unsubstituted phenylphosphonic acid, manufactured by NISSAN CHEMICAL INDUSTRIES, LTD., molecular weight 221.5
T-1287: Decamethylenedicarbonyldibenzoyl hydrazide, manufactured by ADEKA, molecular weight: 438.6
ADK STAB NA-21: A metal salt of phosphoric ester, manufactured by ADEKA
Njester TF-1: Tricyclohexylamide trimesate, manufactured by New Japan Chemical Co., Ltd., melting point: 380° to 390° C., molecular weight: 453.6
CHROMOFINE BLUE 63: Copper phthalocyanine, manufactured by Danichiseika Color & Chemicals Mfg. Co., Ltd., molecular weight: 576.1
MICROACE P-6: Talc, manufactured by NIPPON TALC Co., Ltd.
[Filler]
ECSO3T-187: Glass fiber, manufactured by Nippon Electric Glass Co., Ltd.
[Compatibilizing Agent]
Bondfast 7M: Epoxy-modified polyethylene, manufactured by Sumitomo Chemical Co., Ltd., MFR: 7 g/10 minutes

TABLE 1

|  |  | Examples | | | | | | |
|---|---|---|---|---|---|---|---|---|
|  |  | 1 | 2 | 3 | 4 | 5 | 6 | 7 |
| First Kneading (Step A) | | | | | | | | |
| Polylactic Acid Resin (PLA) (A) | LACEA H-400 | 100 | 100 | 100 | 100 | 100 | 100 | 100 |
| Crystal Nucleating Agent (B) | SLIPAX H | — | — | — | — | — | — | — |
|  | ECOPROMOTE | — | — | — | — | — | — | — |
|  | T-1287 | 1.0 | — | — | — | — | — | — |

TABLE 1-continued

| | | Examples | | | | | | |
|---|---|---|---|---|---|---|---|---|
| | | 1 | 2 | 3 | 4 | 5 | 6 | 7 |
| | ADK STAB NA-21 | — | 1.0 | — | — | — | — | — |
| | Njester TF-1 | — | — | 1.0 | — | — | — | — |
| | CHROMOFINE BLUE 63 | — | — | — | 1.0 | — | 1.0 | 1.0 |
| | MICROACE P-6 | — | — | — | — | 1.0 | — | — |
| Plasticizer (C) | Dibenzyl Adipate | 10 | 10 | 10 | 10 | 10 | — | — |
| | DIFATTY-101 | — | — | — | — | — | 10 | — |
| | (MeEO$_3$)$_2$SA | — | — | — | — | — | — | 10 |
| | N-DOP | — | — | — | — | — | — | — |
| | VINYCIZER 50 | — | — | — | — | — | — | — |
| Polypropylene Resin (D) | BC03B | — | — | — | — | — | — | — |
| Compatibilizing Agent (E) | Bondfast 7M | — | — | — | — | — | — | — |
| Filler | ECS03T-187 | — | — | — | — | — | — | — |
| First Melt-Kneading Temperature (° C.) | | 180 | 180 | 180 | 180 | 180 | 180 | 180 |
| Relative Crystallinity (%) of Polylactic Acid-Containing Melt-Kneaded Mixture | | 75 | 80 | 80 | 95 | 90 | 95 | 100 |
| Second Kneading (Step B) | | | | | | | | |
| Polylactic Acid-Containing Melt-Kneaded Mixture | | 30 | 30 | 30 | 30 | 30 | 30 | 30 |
| Polylactic Acid Resin (PLA) (A) | LACEA H-400 | — | — | — | — | — | — | — |
| Crystal Nucleating Agent (B) | SLIPAX H | — | — | — | — | — | — | — |
| | ECOPROMOTE | — | — | — | — | — | — | — |
| | T-1287 | — | — | — | — | — | — | — |
| | ADK STAB NA-21 | — | — | — | — | — | — | — |
| | Njester TF-1 | — | — | — | — | — | — | — |
| | CHROMOFINE BLUE 63 | — | — | — | — | — | — | — |
| | MICROACE P-6 | — | — | — | — | — | — | — |
| Plasticizer (C) | Dibenzyl Adipate | — | — | — | — | — | — | — |
| | DIFATTY-101 | — | — | — | — | — | — | — |
| | (MeEO$_3$)$_2$SA | — | — | — | — | — | — | — |
| | N-DOP | — | — | — | — | — | — | — |
| | VINYCIZER 50 | — | — | — | — | — | — | — |
| Polypropylene Resin (D) | BC03B | 70 | 70 | 70 | 70 | 70 | 70 | 70 |
| Compatibilizing Agent (E) | Bondfast 7M | 10 | 10 | 10 | 10 | 10 | 10 | 10 |
| Filler | ECS03T-187 | — | — | — | — | — | — | — |
| Second Melt-Kneading Temperature (° C.) | | 170 | 170 | 170 | 170 | 170 | 170 | 170 |
| Properties | | | | | | | | |
| Izod Impact Strength (J/m) | | 85 | 88 | 91 | 102 | 85 | 105 | 108 |
| HDT Heat Resistance (° C.) | | 103 | 108 | 109 | 112 | 118 | 115 | 114 |

*Amounts of the crystal nucleating agent, the plasticizer, and the filler used are expressed by parts by weight, based on 100 parts by weight of the polylactic acid resin (PLA); the amount of the compatibilizing agent used is expressed by parts by weight based on 100 parts by weight of a total amount of the PLA and the polypropylene resin; the amount of the polypropylene resin contained in the first kneading is expressed by parts by weight, based on 100 parts by weight of PLA, and the amounts of the polylactic acid-containing kneaded mixture and the polypropylene resin contained in the second kneading are expressed by % by weight when a total of these amounts are supposed to be 100% by weight.

TABLE 2

| | | Examples | | | | Comparative Examples | | |
|---|---|---|---|---|---|---|---|---|
| | | 8 | 9 | 10 | 11 | 1 | 2 | 3 |
| First Kneading (Step A) | | | | | | | | |
| Polylactic Acid Resin (PLA) (A) | LACEA H-400 | 100 | 100 | 100 | 100 | 100 | 100 | 100 |
| Crystal Nucleating Agent (B) | SLIPAX H | — | 0.5 | 0.5 | 0.5 | — | — | — |
| | ECOPROMOTE | — | 0.5 | 0.5 | 0.5 | — | — | — |
| | T-1287 | — | — | — | — | — | — | — |
| | ADK STAB NA-21 | — | — | — | — | — | — | — |
| | Njester TF-1 | — | — | — | — | — | — | — |
| | CHROMOFINE BLUE 63 | 1.0 | — | — | — | 1.0 | 1.0 | 1.0 |
| | MICROACE P-6 | — | — | — | — | — | — | — |
| Plasticizer (C) | Dibenzyl Adipate | — | — | — | — | — | — | — |
| | DIFATTY-101 | — | — | — | — | — | — | — |
| | (MeEO$_3$)$_2$SA | 10 | 10 | 10 | 10 | 10 | — | — |
| | N-DOP | — | — | — | — | — | 10 | — |
| | VINYCIZER 50 | — | — | — | — | — | — | 10 |
| Polypropylene Resin (D) | BC03B | — | — | — | — | — | — | — |
| Compatibilizing Agent (E) | Bondfast 7M | — | — | — | — | — | — | — |

TABLE 2-continued

|  |  | Examples | | | | Comparative Examples | | |
| --- | --- | --- | --- | --- | --- | --- | --- | --- |
|  |  | 8 | 9 | 10 | 11 | 1 | 2 | 3 |
| Filler | ECS03T-187 | 5 | — | 5 | — | — | — | — |
| First Melt-Kneading Temperature (° C.) | | 180 | 180 | 180 | 180 | 180 | 180 | 180 |
| Relative Crystallinity (%) of Polylactic Acid-Containing Melt-Kneaded Mixture | | 100 | 90 | 90 | 90 | 100 | 60 | 50 |
| Second Kneading (Step B) | | | | | | | | |
| Polylactic Acid-Containing Melt-Kneaded Mixture | | 30 | 30 | 30 | 50 | 30 | 30 | 30 |
| Polylactic Acid Resin (PLA) (A) | LACEA H-400 | — | — | — | — | — | — | — |
| Crystal Nucleating Agent (B) | SLIPAX H | — | — | — | — | — | — | — |
|  | ECOPROMOTE | — | — | — | — | — | — | — |
|  | T-1287 | — | — | — | — | — | — | — |
|  | ADK STAB NA-21 | — | — | — | — | — | — | — |
|  | Njester TF-1 | — | — | — | — | — | — | — |
|  | CHROMOFINE BLUE 63 | — | — | — | — | — | — | — |
|  | MICROACE P-6 | — | — | — | — | — | — | — |
| Plasticizer (C) | Dibenzyl Adipate | — | — | — | — | — | — | — |
|  | DIFATTY-101 | — | — | — | — | — | — | — |
|  | $(MeEO_3)_2SA$ | — | — | — | — | — | — | — |
|  | N-DOP | — | — | — | — | — | — | — |
|  | VINYCIZER 50 | — | — | — | — | — | — | — |
| Polypropylene Resin (D) | BC03B | 70 | 70 | 70 | 50 | 70 | 70 | 70 |
| Compatibilizing Agent (E) | Bondfast 7M | 10 | 10 | 10 | 10 | — | 10 | 10 |
| Filler | ECS03T-187 | — | — | — | — | — | — | — |
| Second Melt-Kneading Temperature (° C.) | | 170 | 170 | 170 | 170 | 170 | 170 | 170 |
| Properties | | | | | | | | |
| Izod Impact Strength (J/m) | | 98 | 118 | 121 | 92 | 45 | 55 | 65 |
| HDT Heat Resistance (° C.) | | 125 | 88 | 101 | 75 | 68 | 72 | 78 |

*Amounts of the crystal nucleating agent, the plasticizer, and the filler used are expressed by parts by weight, based on 100 parts by weight of the polylactic acid resin (PLA); the amount of the compatibilizing agent used is expressed by parts by weight based on 100 parts by weight of a total amount of the PLA and the polypropylene resin; the amount of the polypropylene resin contained in the first kneading is expressed by parts by weight, based on 100 parts by weight of PLA, and the amounts of the polylactic acid-containing kneaded mixture and the polypropylene resin contained in the second kneading are expressed by % by weight when a total of these amounts are supposed to be 100% by weight.

TABLE 3

|  |  | Comparative Examples | | | | | | |
| --- | --- | --- | --- | --- | --- | --- | --- | --- |
|  |  | 4 | 5 | 6 | 7 | 8 | 9 | 10 |
| First Kneading (Step A) | | | | | | | | |
| Polylactic Acid Resin (PLA) (A) | LACEA H-400 | 100 | 100 | 100 | 100 | 100 | 100 | 100 |
| Crystal Nucleating Agent (B) | SLIPAX H | — | — | — | — | 0.5 | 0.5 | 0.5 |
|  | ECOPROMOTE | — | — | — | — | 0.5 | 0.5 | 0.5 |
|  | T-1287 | — | — | — | — | — | — | — |
|  | ADK STAB NA-21 | — | — | — | — | — | — | — |
|  | Njester TF-1 | — | — | — | — | — | — | — |
|  | CHROMOFINE BLUE 63 | 1.0 | — | 1.0 | — | — | — | — |
|  | MICROACE P-6 | — | — | — | — | — | — | — |
| Plasticizer (C) | Dibenzyl Adipate | 10 | 10 | — | 10 | — | — | — |
|  | DIFATTY-101 | — | — | — | — | — | — | — |
|  | $(MeEO_3)_2SA$ | — | — | — | — | 10 | 10 | 10 |
|  | N-DOP | — | — | — | — | — | — | — |
|  | VINYCIZER 50 | — | — | — | — | — | — | — |
| Polypropylene Resin (D) | BC03B | 233 | — | — | — | 233 | 233 | 100 |
| Compatibilizing Agent (E) | Bondfast 7M | 10 | — | — | 10 | 10 | 10 | 10 |
| Filler | ECS03T-187 | — | — | — | — | — | 5 | — |
| First Melt-Kneading Temperature (° C.) | | 170 | 180 | 180 | 180 | 170 | 170 | 170 |
| Relative Crystallinity (%) of Polylactic Acid-Containing Melt-Kneaded Mixture | | 50 | 40 | 60 | 40 | 40 | 40 | 50 |
| Second Kneading (Step B) | | | | | | | | |
| Polylactic Acid-Containing Melt-Kneaded Mixture | | — | 30 | 30 | 30 | — | — | — |
| Polylactic Acid Resin (PLA) (A) | LACEA H-400 | — | — | — | — | — | — | — |
| Crystal Nucleating Agent (B) | SLIPAX H | — | — | — | — | — | — | — |
|  | ECOPROMOTE | — | — | — | — | — | — | — |
|  | T-1287 | — | — | — | — | — | — | — |
|  | ADK STAB NA-21 | — | — | — | — | — | — | — |
|  | Njester TF-1 | — | — | — | — | — | — | — |
|  | CHROMOFINE BLUE 63 | — | 1.0 | — | 1.0 | — | — | — |
|  | MICROACE P-6 | — | — | — | — | — | — | — |

TABLE 3-continued

|  |  | Comparative Examples | | | | | | |
|---|---|---|---|---|---|---|---|---|
|  |  | 4 | 5 | 6 | 7 | 8 | 9 | 10 |
| Plasticizer (C) | Dibenzyl Adipate | — | — | 10 | — | — | — | — |
|  | DIFATTY-101 | — | — | — | — | — | — | — |
|  | (MeEO$_3$)$_2$SA | — | — | — | — | — | — | — |
|  | N-DOP | — | — | — | — | — | — | — |
|  | VINYCIZER 50 | — | — | — | — | — | — | — |
| Polypropylene Resin (D) | BC03B | — | 70 | 70 | 70 | — | — | — |
| Compatibilizing Agent (E) | Bondfast 7M | — | 10 | 10 | — | — | — | — |
| Filler | ECS03T-187 | — | — | — | — | — | — | — |
| Second Melt-Kneading Temperature (° C.) | | — | 170 | 170 | 170 | — | — | — |
| Properties | | | | | | | | |
| Izod Impact Strength (J/m) | | 73 | 72 | 70 | 86 | 97 | 105 | 80 |
| HDT Heat Resistance (° C.) | | 71 | 68 | 85 | 65 | 73 | 78 | 65 |

*Amounts of the crystal nucleating agent, the plasticizer, and the filler used are expressed by parts by weight, based on 100 parts by weight of the polylactic acid resin (PLA); the amount of the compatibilizing agent used is expressed by parts by weight based on 100 parts by weight of a total amount of the PLA and the polypropylene resin; the amount of the polypropylene resin contained in the first kneading is expressed by parts by weight, based on 100 parts by weight of PLA, and the amounts of the polylactic acid-containing kneaded mixture and the polypropylene resin contained in the second kneading are expressed by % by weight when a total of these amounts are supposed to be 100% by weight.

TABLE 4

|  | Carboxylic Acid | | Alcohol | | |
|---|---|---|---|---|---|
|  | Kinds | Number of Carbon Atoms | Kinds | Number of Carbon Atoms | Average Molecular Weight |
| Dibenzyl Adipate | Adipic Acid | 6 | Benzyl Alcohol | 7 | 326 |
| DIFATTY-101 | Adipic Acid | 6 | (1/1) Mixture of Diethylene Glycol Monomethyl Ether/ Benzyl Alcohol | 5, 7 | 338.4 |
| (MeEO$_3$)$_2$SA | Succinic Acid | 4 | Triethylene Glycol Monomethyl Ether | 7 | 410 |
| N-DOP | Phthalic Acid | 8 | 2-Ethylhexyl Alcohol | 8 | 234 |
| VINYCIZER 50 | Adipic Acid | 6 | Isodecyl Alcohol | 10 | 213 |

It is clear from the results of Tables 1 to 3 that the resin compositions (Examples 1 to 11) obtainable by the method of the present invention show high impact resistance. It is suggest that by using a specified plasticizer and carrying out two-step melt-kneading as mentioned above, an alloy composition having excellent impact resistance is obtained. In addition, it can be seen from Examples 4 to 8 that an alloy composition obtainable by previously melt-kneading a polylactic acid resin with a phthalocyanine or talc is also excellent in heat resistance, in addition to impact resistance.

The resin composition obtainable by the method of the present invention can be suitably used in various industrial applications, such as daily sundries, household electric appliance parts, and automobile parts.

The invention claimed is:

1. A method for producing a resin composition, comprising the steps of:
   melt-kneading a raw material A comprising a polylactic acid resin, a crystal nucleating agent, and a plasticizer comprising an ester compound formed between a polycarboxylic acid having a hydrocarbon group having 1 to 7 carbon atoms and a mono-alcohol having a hydrocarbon group having 1 to 7 carbon atoms, to prepare a polylactic acid-containing melt-kneaded mixture having a relative crystallinity of 70% or more (step A); and
   further melt-kneading the polylactic acid-containing melt-kneaded mixture obtained by the step A and a ray material B comprising a polypropylene resin and a compatibilizing agent (step B).

2. The method according to claim 1, wherein the crystal nucleating agent is at least one member selected from the group consisting of compounds having a hydroxyl group ind an amide group in one molecdle, metal salts of phenylphosphonic acids, phthalocyanine, metal salts of phosphoric esters, metal salts of diaikyl esters of aromatic sulfonic acids, metal salts of rosin acids, aromatic carboxylic acid amides, rosin acid amides, carbohydrazides, N-substituted ureas, salts of melamine compounds, uracils, and talc.

3. The method according to claim 1, wherein the plasticizer comprises an ester compound having two or more ester groups In one molecule, wherein at least one of an alcohol component constituting the ester is an alkylene oxide adduct of an alcohol with an alkylene oxide having from 2 to 3 carbon atoms per one hydroxyl group in an amount of from 0.5 to 3.5 mol on average.

4. The method according to claim 1, wherein a weight ratio of the polylactic acid resin to the polypropylene resin in the resin composition, i.e. polylactic acid resin/polypropylene resin, is from 10/90 to 60/40.

5. The method according to claim 1, wherein the crystal nucleating agent is contained in an amount of from 0.1 to 5 parts by weight, based on 100 parts by weight of the polylactic acid resin.

6. The method according to claim 1, wherein the polycarboxylic acid having a hydrocarbon group having 1 to 7 carbon atoms is at least one member selected front the group consisting of isophthalic acid, terephthalic acid, malic acid, citric acid, oxalic acid, malonic acid, succinic acid, maleic acid, fumaric acid, and adipic acid.

7. The method according to claim 1, wherein the mono-alcohol having a hydrocarbon group having 1 to 7 carbon atoms is at least one member selected from the group consisting of benzyl alcohol, diethylene glycol monomethyl ether, and triethylene glycol monomethyl ether.

8. The method according to claim 1, wherein the plasticizer is contained in an amount of from 5 to 30 parts by weight, based on 100 parts by weight of the polylactic acid resin.

9. The method according to claim 1, wherein the melt-kneading temperature of the step A is from 170° to 220° C.

10. The method according to claim 1, wherein the melt-kneading temperature of the step B is from 160° to 210° C.

11. A method for producing a resin composition, comprising the steps of:
   melt-kneading a raw material A comprising a polylactic acid resin, a crystal nucleating agent, and a plasticizer comprising an ester compound formed between a polycarboxylic acid having a hydrocarbon group having 1 to 7 carbon atoms and a mono-alcohol having a hydrocarbon group having 1 to 7 carbon atoms, to prepare a polylactic acid-containing melt-kneaded mixture having a relative crystallinity of 70% or more (step A); and
   further melt-kneading the polylactic acid-containing melt-kneaded mixture obtained by the step A and a raw material B comprising a polypropylene resin and a compatibilizing agent (step B),
   wherein a weight ratio of the polylactic acid resin to the polypropylene resin in the resin composition, i.e. polylactic acid resin/polypropylene resin, is from 10/90 to 60/40.

12. A method for producing a resin composition, comprising the steps of:
   melt-kneading a raw material A comprising a polylactic acid resin, a crystal nucleating agent, and a plasticizer comprising an ester compound formed between a polycarboxylic acid having hydrocarbon group having 1 to 7 carbon atoms and a mono-alcohol having a hydrocarbon group having 1 to 7 carbon atoms, to prepare a polylactic acid-containing melt-kneaded mixture having a relative crystallinity of 70% or more (step A); and
   further melt-kneading the polylactic acid-containing melt-kneaded mixture obtained by the step A and raze material B comprising a polypropylene resin and a compatibilizing agent (step B),
   wherein the crystal nucleating agent is at least one member selected from the group consisting of compounds having a hydroxyl group and an amide group in one molecule, metal salts of phenylphosphonic acids, phthalocyanine, metal salts of phosphoric esters, metal salts of dialkyl esters of aromatic sulfonic acids, metal salts of rosin acids, aromatic carboxylic acid amides, rosin acid amides, carbohydrazides, N-substituted ureas, salts of melamine compounds, uracils, and talc, and
   wherein the plasticizer comprises an ester compound having two or more ester groups in one molecule, wherein at least one of an alcohol component constituting the ester is an alkylene oxide adduct of an alcohol with an alkylene oxide having from 2 to 3 carbon atoms per one hydroxyl group in an amount of from 0.5 to 3.5 mol on average.

\* \* \* \* \*